United States Patent [19]

Kondow et al.

[11] Patent Number: 4,689,384
[45] Date of Patent: Aug. 25, 1987

[54] CURABLE ORGANOPOLYSILOXANE COMPOSITION

[75] Inventors: Kiyohiro Kondow; Takeshi Mihama; Yasuaki Hara; Hisashi Aoki; Nobuyuki Hasebe, all of Gunma, Japan

[73] Assignee: Shin-Etsu Chemical Co., Ltd., Tokyo, Japan

[21] Appl. No.: 842,531

[22] Filed: Mar. 21, 1986

[30] Foreign Application Priority Data

Apr. 17, 1985 [JP] Japan .................................. 60-81990

[51] Int. Cl.$^4$ ............................................ C08G 77/06
[52] U.S. Cl. ...................................... 528/15; 528/31; 528/32
[58] Field of Search ............................. 528/15, 31, 32

[56] References Cited

U.S. PATENT DOCUMENTS 4,544,696 10/1985 Streusand et al. .................... 528/15
4,559,396 12/1985 Sasaki et al. ........................ 528/15
4,585,669 4/1986 Eckberg ............................. 528/15

Primary Examiner—Melvyn I. Marquis
Attorney, Agent, or Firm—Jules E. Goldberg

[57] ABSTRACT

So-called addition-type curable organopolysiloxane compositions curable by the hydrosilation reaction between vinyl groups of a dimethylpolysiloxane and hydrogen atoms directly bonded to the silicon atoms in a methylhydrogenpolysiloxane in the presence of a platinum catalyst can be imparted with a greatly increased pot life to have improved workability when the composition is admixed with a halogen- or alkoxy-substituted olefinic organic compound such as allyl halides, 1,3- and 2,3-dihalogenopropenes, 2-alkyl-3-halogenopropenes, 1,3- and 1,4-dihalogenobutenes-2 and alkyl allyl ethers as a moderator of the crosslinking reaction without any adverse effect on the curability of the composition.

8 Claims, 1 Drawing Figure

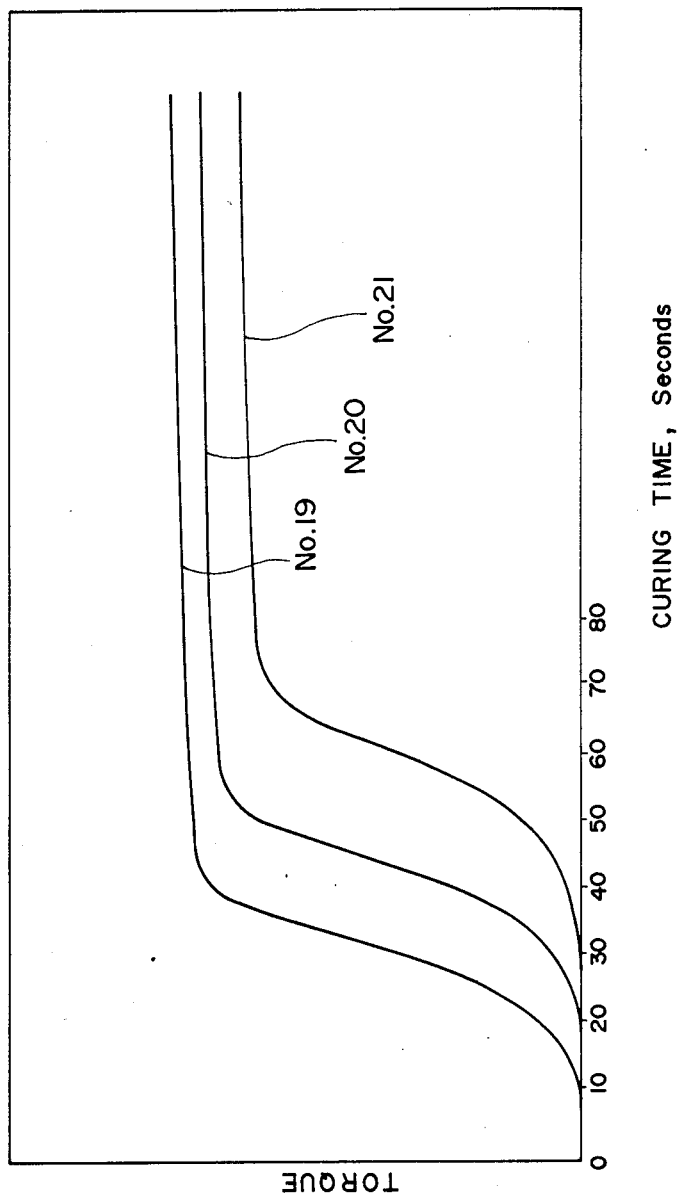
FIGURE

CURABLE ORGANOPOLYSILOXANE COMPOSITION

BACKGROUND OF THE INVENTION

The present invention relates to a curable organopolysiloxane composition or, more particularly, to a curable organopolysiloxane composition with excellent workability and curing behavior imparted by the addition of a moderator for the crosslinking reaction.

As is well known, the crosslinking reaction in a class of curable organopolysiloxane compositions proceeds by the mechanism of the so-called hydrosilation in which an addition reaction takes place between aliphatically unsaturated groups or, typically, vinyl groups bonded to the silicon atoms of an organopolysiloxane and hydrogen atoms directly bonded to the silicon atoms in an organohydrogenpolysiloxane in the presence of a noble metal, e.g. platinum, catalyst and such curable organopolysiloxane compositions of so-called addition-type are widely used in various applications in which curing of the composition should desirably be effected at room temperature or at a relatively low temperature, if heating is required.

A problem or disadvantage involved in the addition-type curable organopolysiloxane composition is that the pot life of a ready-mixed composition is sometimes unduly limited with poor workability in the practical application of the composition and, when extension of the pot life is intended by the addition of a reaction moderator, difficulties are encountered in obtaining good balance between the pot life and curing behavior of the composition although various kinds of compounds have been proposed as the moderator including perchloroethylene (see Japanese Patent Publication No. 47-6111), acetylenic alcohols (see Japanese Patent Publication No. 44-31476), acrylonitrile (see Japanese Patent Publication No. 45-22018), maleate compounds (see Japanese Patent Publication No. 56-4655), silylated compounds (see Japanese Patent Publication No. 59-133252) and others.

These compounds proposed in the prior art as a moderator of the addition reaction, however, have their respective disadvantages. For example, perchloroethylene is effective only when it is used in a large amount so that no clear demarcation can be found between the effect by dilution with a solvent and the effect of reaction retardation per se by the compound. Such a composition admixed with a large volume of perchloroethylene can no longer be used as a solventless coating composition as a matter of course. The acetylenic unsaturation in the acetylenic alcohol has reactivity with the silicon-bonded hydrogen atoms in the organohydrogenpolysiloxane so that a curable organopolysiloxane composition admixed with an acetylenic alcohol is subject to decrease in the curability during storage due to the consumption of the silicon-bonded hydrogen atoms as the functional groups pertaining to the curing reaction. Acrylonitrile also has a relatively low activity for the retardation of the crosslinking reaction so that no desired effect can be obtained by the addition of a small amount thereof while increase of the amount may cause incomplete curing of the composition in addition to the problem in the workers' health and environmental pollution due to the unpleasant odor and toxicity of the compound. The maleate compounds have similar problems to acrylonitrile. The silylated compounds are also poorly effective and the desired effect of reaction retardation can be obtained only by the addition of a relatively large amount thereof. In addition, silylated compounds are generally susceptible to hydrolysis and must be handled or stored with particular care.

SUMMARY OF THE INVENTION

The present invention has been completed as a result of the extensive investigations undertaken with an object to solve the above described problems and disadvantages in the curable organopolysiloxane compositions of the prior art relative to the reaction moderator. The curable organopolysiloxane composition of the present invention comprises:

(a) 100 parts by weight of an organopolysiloxane having, in a molecule, at least two aliphatically unsaturated groups each bonded to a silicon atom different from the other;

(b) from 0.1 to 20 parts by weight of an organosilicon compound having, in a molecule, at least two hydrogen atoms each directly bonded to a silicon atom different from the other;

(c) a catalytic amount of platinum or a platinum compound; and (d) from 0.001 to 5.0 parts by weight of a halogen- or alkoxy substituted olefinic compound represented by the general formula $$R_2C=CR-CR_2-X, \tag{I}$$

in which each of the groups denoted by R is, independently from the others, an atom or group selected from the class consisting of a hydrogen atom, halogen atoms and monovalent hydrocarbon groups and X is a halogen atom or a lower alkoxy group.

BRIEF DESCRIPTION OF THE DRAWING

The FIGURE is a diagram showing the curability curves of the compositions prepared in Example 5 obtained on a rheometer.

DETAILED DESCRIPTION OF THE PREFERRED EMBODIMENTS

As is understood from the above given summarizing description, the curable composition of the invention is characterized by the addition of the specific olefinic compound of the general formula (I) as a reaction moderator, by virtue of which the composition is imparted with greatly improved workability and storability without adverse effects on the curing behavior at a low temperature and rapidness of curing by ultraviolet irradiation. The inventive composition is useful for the surface-releasing treatment of plastic films by overcoming the prior art difficulties. Moreover, the inventive composition has moderate curability even without addition of any organic solvent so that the solventless composition is applicable to any plastic materials susceptible to the attack of organic solvents. When the component (d) as the moderator is a halogen-substituted compound, the flash point of the composition is not decreased by the addition thereof so that the solventless composition can be worked with sufficient safety. Different from curable organopolysiloxane compositions admixed with conventional reaction moderator compounds, furthermore, the inventive composition is advantageously free from the problem of yellowing or browning.

The organopolysiloxane as the component (a) should have, in a molecule, at least two aliphatically unsaturated groups each bonded to a silicon atom different from the other. The organopolysiloxane is represented by the average unit formula $$R^1{}_a R^2{}_b SiO_{4-a-b)/2} \quad (II)$$

in which $R^1$ is an aliphatically unsaturated group such as vinyl, allyl, 2-(3-cyclohexenyl)ethyl and acryloxyalkyl groups, $R^2$ is a monovalent hydrocarbon group having 1 to 8 carbon atoms and free from aliphatic unsaturation such as alkyl groups, e.g. methyl, ethyl, propyl and butyl groups, aryl groups, e.g. phenyl and tolyl groups, and cycloalkyl groups, e.g. cyclohexyl group, as well as a substituted monovalent hydrocarbon group obtained by replacing a part or all of the hydrogen atoms in the above named hydrocarbon groups with substituents such as halogen atoms, cyano groups and the like exemplified by chloromethyl, 3,3,3-trifluoropropyl and cyanomethyl groups, and the subscripts a and b are a positive number in the range from 1 to 3 inclusive and zero or a positive number not exceeding 3, respectively, with the proviso that a+b does not exceed 3. It is preferable that at least 70% by moles of the groups denoted by $R^2$ are methyl groups. The organopolysiloxane may contain one or more of disilane linkages or silalkylene linkages in the molecular structure.

The organopolysiloxane is preferably a diorganopolysiloxane having a linear molecular structure with the value of a+b equal to about 2. Although the aliphatically unsaturated groups such as vinyl groups are bonded to the silicon atoms at any position in the molecular chain, it is preferable that each of the terminal silicon atoms of the molecular chain should have one or more of vinyl groups bonded thereto. The organopolysiloxane should have a viscosity in the range from 10 to 10,000 centistokes at 25° C.. When the viscosity of the component (a) is too low, the composition formulated therewith cannot give a cured product having satisfactorily high mechanical strength. When the viscosity thereof is too high, on the other hand, difficulties are encountered in obtaining full uniformity of the blend thereof with other components.

The component (b) is an organosilicon compound which serves as a crosslinking agent of the organopolysiloxane as the component (a) and should have, in a molecule, at least two hydrogen atoms directly bonded to the silicon atoms. Although the organosilicon compound can be an organosilane compound, it is preferably an organohydrogenpolysiloxane in which the silicon-bonded hydrogen atoms are each bonded to a silicon atom different from the others. The molecular configuration of the organohydrogenpolysiloxane is not particularly limitative including straightly linear, branched chain-like and cyclic ones. The organohydrogenpolysiloxane should have a viscosity in the range from 10 to 10,000 cnetistokes at 25° C.. The amount of the component (b) in the inventive composition should be in the range from 0.1 to 20 parts by weight per 100 parts by weight of the organopolysiloxane as the component (a). Alternatively, the blending ratio of the components (a) and (b) should be determined in such a manner that from 0.1 to 5.0 moles or, preferably, from 1.0 to 2.0 moles of the silicon-bonded hydrogen atoms in the component (b) are provided per mole of the aliphatically unsaturated groups, e.g. vinyl groups, in the organopolysiloxane as the component (a).

The component (c) added to the inventive composition is a catalyst to accelerate the addition reaction between the aliphatically unsaturated groups in the component (a) and the silicon-bonded hydrogen atoms in the component (b). Such a catalytic compound is well known in the art and platinum compounds are usually used for the purpose including chloroplatinic acid and complexes thereof with alcohol, olefin, vinyl-siloxane and the like. The platinum catalyst is added to the composition in a catalytic amount which is not particularly limitative depending on the desired velocity of curing of the composition. It is usual, however, that the platinum compound is added to the composition in an amount in the range from 0.0001 to 0.1 part by weight as platinum per 100 parts by weight of the organopolysiloxane as the component (a).

The component (d) is a reaction moderator to adequately control the crosslinking reaction taking place at room temperature in the composition composed of the above described components (a) to (c). The component (d) is a compound never used for such a purpose in the prior art and is represented by the general formula (I) given before. In the formula, each of the groups denoted by the symbol R is, independently from the others, an atom or group selected from the class consisting of a hydrogen atom, halogen atoms and halogen-substituted or unsubstituted monovalent hydrocarbon groups free from aliphatic unsaturation exemplified by alkyl groups, e.g. methyl, ethyl, propyl and butyl groups, aryl groups, e.g. phenyl and tolyl groups, cycloalkyl groups, e.g. cyclohexyl group, and halogen-substituted hydrocarbon groups, e.g. chloromethyl group, and X is a halogen atom or a lower alkoxy group such as methoxy, ethoxy, propoxy and butoxy groups. Several classes of the compound suitable as the component (d) include allyl halides, 1,3-dihalogenopropenes, 2,3-dihalogenopropenes, 2-alkyl-3-halogenopropenes, 1,4-dihalogenobutenes-2, alkyl allyl ethers and the like. The halogen is preferably chlorine.

Although the compound as the component (d) is effective to mask the activity of the platinum catalyst, it is inert to the components (a) and (b) and does not form an irreversible coordination compound with the platinum compound so that the compound is useful as a reaction moderator of the crosslinking reaction in the component composed of the componenets (a) to (c) to give a possibility of greatly extending the storability or pot life of the composition without any adverse effect on the curability of the composition. The amount of the component (d) added to the inventive composition should be in the range from 0.001 to 5.0 parts by weight or, preferably, from 0.1 to 1.0 part by weight per 100 parts by weight of the component (a). When the amount thereof is too small, the desired moderating effect on the crosslinking reaction cannot be obtained as a matter of course while no additional advantageous effects can be obtained by increasing the amount thereof over the above mentioned upper limit rather with a disadvantage due to the increase in the content of volatile constituents in the composition.

The curable organopolysiloxane composition of the invention can be prepared by uniformly blending the above described components (a) to (d). The procedure of blending is not particularly limitative. For example, the component (d) may be first added to any one or to any combination of two of the components (a) to (c) followed by the admixture with the other component or components. The thus prepared composition of the invention should have a viscosity in the range from 10 to 10,000 centistokes at 25° C. depending on the particular application of the composition.

The curable organopolysiloxane composition of the invention can be admixed with various kinds of optional additives according to need including non-reactive organopolysiloxanes, organic polymers such as oligomeric polyisobutylenes, cellulose derivatives capable of imparting the cured film of the composition with receptivity of writing inks, fillers such as finely divided silica powder, titanium dioxide, iron oxide and the like, coloring agents, i.e. pigments and dyes, low-molecular organopolysiloxanes terminated at the molecular chain ends each with a silanolic hydroxy group to serve as a modifier of the cured films of the composition and others although the amount of these optional additives should preferably be limited not to exceed 10% by weight of the overall amount of the composition.

The curable organopolysiloxane of the invention simultaneously has a sufficiently long pot life and good curability so that the composition is useful in a wide variety of applications including the uses as a mold-release agent, potting material, prototype molding material, molding composition with electric insulation, optical gel, for which absence of color or discoloration and clarity are essential, and others. When the inventive composition is used as a surface treatment agent on substrate materials such as papers, films and sheets of plastics, metal foils and the like, the composition is applied to the surface by use of a roll coater, gravure coater, spray gun and the like and then subjected to curing by heating at a temperature of 65° C. or higher or, preferably, 70° C. or higher or by irradiating with ultraviolet light. The inventive composition admixed with an inorganic filler can be molded by injection molding and cured to give a shaped article in a metal mold at 120° to 150° C. within a relatively short time and also can be used for encapsulation and insulation of electric and electronic parts in which curing is complete by heating at about 100° C.

In the following, the curable organopolysiloxane composition of the invention is described in more detail by way of examples, in which the expression of "parts" always refers to "parts by weight" and the values of viscosity are all those obtained by the measurement at 25° C. The symbols Me and Vi in the Examples denote methyl and vinyl groups, respectively.

EXAMPLE 1

A master blend was prepared by uniformly mixing 1500 g of a dimethylpolysiloxane having a viscosity of 60 centistokes and terminated at both molecular chain ends each with a dimethyl vinyl silyl group and 60 g of a methyl hydrogen polysiloxane having a viscosity of 40 centistokes and terminated at both molecular chain ends each with a trimethyl silyl group as expressed by the structural formula $Me_3Si-O-(-SiHMe-O-)_n-SiMe_3$, in which n is a positive integer, and each a 10 g portion of the master blend was admixed with 0.1 g of an octyl alcohol solution of chloroplatinic acid of a concentration of 0.5% by weight as platinum and $1.59 \times 10^{-3}$ mole of one of the unsaturated organic compounds indicated in Table 1 below to give curable organopolysiloxane compositions. Table 1 also shows the pot life of each of the thus prepared compositions at 25° C. and the curability of the compositions when the composition was applied to a polyethylene-laminated paper in a coating amount of 1.0 g/m² by use of a doctor wire #0 and then heated at 120° C. for 30 seconds either immediately after coating or after 5 hours standing as well as absence or appearance of discoloration of the compositions. The curability of the coating film was rated as Good when curing was complete and the cured film could be rubbed with finger without falling off or appearance of cloudiness and rated as Poor when otherwise.

EXAMPLE 2

A master blend prepared by uniformly mixing 100 parts of a methylvinyl-dimethyl polysiloxane having a viscosity of 600 cnetistokes and terminated at both molecular chain ends each with a dimethyl vinyl silyl group, of which the content of the vinyl groups was 3.0% by moles based on the overall amount of the organic groups, and 5.0 parts of a methylhydrogen-dimethyl polysiloxane having a viscosity of 100 centistokes and terminated at both molecular chain ends each with a trimethyl silyl group, of which the content of the methylhydrogen siloxane units was 90% by moles based on the overall siloxane units, was uniformly admixed with one of the olefinically unsatruated organic compounds indicated in Table 2 below in an amount also given in the table and then with 2 parts of a complex of chloroplatinic acid and a vinylsiloxane containing 100 ppm by weight of platinum based on the methylvinyl-dimethyl polysiloxane to give curable organopolysiloxane compositions No. 1 to No. 12.

TABLE 1

| Unsaturated compound | Pot life, hours | Curability As coated | Curability After 5 hours | Discoloration |
|---|---|---|---|---|
| Example | | | | |
| Allyl chloride | 27 | Good | Good | None |
| Allyl bromide | At least 120 | Good | Good | None |
| Allyl iodide | At least 120 | Good | Good | None |
| cis-1,4-Dichlorobutene-2 | At least 120 | Good | Good | None |
| 2,3-Dichloropropene | At least 120 | Good | Good | None |
| 1,3-Dichloropropene | At least 120 | Good | Good | None |
| 3-Chloro-2-methylpropene | 20 | Good | Good | None |
| Allyl ethyl ether | 10 | Good | Good | None |
| Comparative Example | | | | |
| trans-Crotonyl alcohol | 3 | Good | Poor | Brown |
| 1,1-Dichloropropene | (*) | — | — | None |
| N,N—Dimethyl allyl amine | 1.5 | Poor | Poor | Yellow |
| 3,5-Dimethyl-1-hexyn-3-ol | 20 | Good | Poor | Brown |

(*) Immediately gelled as blended

Table 2 shows the pot life of each of these compositions at 25° C. and curability thereof when the composition was applied to a polyethylene-laminated paper in a coating amount of 0.8 g/m² and heated for 30 seconds in a hot-air circulation oven at 120° C. or 150° C. The criteria of the curability were the same as in Table 1. Separately, a pressure-sensitive adhesive tape (Lumirror 31B, a product by Nitto Denki Kogyo Co.) was applied and bonded to the surface of the layer of the organopolysiloxane composition on the laminated paper after curing at 150° C. for 30 seconds and the peeling resistance of the adhesive tape was determined from the substrate surface to give the results shown in Table 2 in g/25 mm.

TABLE 2

| No. | Unsaturated compound (parts) | Pot life, hours | Curability At 120° C. | Curability At 150° C. | Peeling resistance, g/25 mm |
|---|---|---|---|---|---|
| 1 | 2,3-Dichloropropene (0.1) | 6 | Good | Good | 12 |
| 2 | 2,3-Dichloropropene (0.3) | 16 | Good | Good | 12 |
| 3 | 2,3-Dichloropropene (0.5) | 36 | Poor | Good | 16 |
| 4 | 1,3-Dichloropropene (0.1) | 15 | Good | Good | 12 |
| 5 | 1,3-Dichloropropene 0.3) | 24 | Poor | Good | 14 |
| 6 | 1,3-Dichloropropene 0.5) | At least 60 | Poor | Good | 16 |
| 7 | 1,4-Dichlorobutene-2(0.1) | 24 | Good | Good | 12 |
| 8 | 1,4-Dichlorobutene-2(0.3) | 48 | Poor | Good | 13 |
| 9 | 1,4-Dichlorobutene-2(0.5) | At least 80 | Poor | Good | 16 |
| 10 | Benzyl chloride (0.5) | 30 seconds | — | — | — |
| 11 | Crotonyl alcohol (0.5) | 60 seconds | — | — | — |
| 12 | 1,1-Dichloropropene (0.5) | 30 seconds | — | — | — |

No. 1–No. 9: Inventive examples
No. 10–No. 12: Comparative examples

EXAMPLE 3

Curable organopolysiloxanes No. 13 and No. 14 were prepared each by uniformly blending 90 parts of a dimethyl polysiloxane having a viscosity of 60 centistokes and terminated at both molecular chain ends each with a trivinyl silyl group, of which the content of the vinyl groups was 1.5% by moles based on the overall amount of the organic groups, 10 parts of a methylvinyldimethyl polysiloxane having a viscosity of 50,000 centistokes and terminated at both molecular chain ends each with a trimethyl silyl group, of which the content of the vinyl groups was 0.3% by moles based on the overall amount of the organic groups, 1 part of a methylhydrogen polysiloxane having a viscosity of 40 centistokes and terminated at both molecular chain ends each with a dimethyl silyl group, 2 parts of a complex of chloroplatinic acid and a vinylsiloxane containing 1% by weight of platinum, and 1 part of 1,3-dichloropropene for No. 13 or 3-methyl-3-hydroxy butyne-1 for No. 14.

A polyethylene-laminated paper was coated with the composition No. 13 or No. 14 in a coating amount of 0.7 g/m² and irradiated for 1 second with ultraviolet light from a mercury lamp of 160 watts output at a distance of 8 cm either immediately after coating or after standing for 3 hours or 6 hours to examine the curability of the compositions. The results were that the curability of the composition No. 13 was good regardless of the interval between coating and ultraviolet irradiation while the composition No. 14 could be cured satisfactorily only when coating was immediately followed by the ultraviolet irradiation and the curability thereof was poor when the ultraviolet irradiation was performed after 3 or 6 hours from coating.

An acrylic sticking adhesive (BPS-8170, a product by Toyo Ink Manufacturing Co.) was applied to the surface of the thus cured organopolysiloxane composition in a coating amount of 30 g/m² followed by a heat treatment at 100° C. for 3 minutes and a lining paper having a basis weight of 40 g/m² was applied and bonded thereto followed by aging at 25° C. for 20 hours under a pressing load of 20 g/cm². The thus prepared sheet was cut into slips of 5 cm width to give test specimens, of which the peeling resistance of the lining paper from the laminated paper was determined by pulling in the direction making an angle of 180° at a peeling velocity of 300 mm/minute on a tensile tester to give the results shown in Table 3 below.

Separately, the same adhesive tape as used in the preceding example was applied and bonded to the surface of the cured organopolysiloxane composition followed by aging at 70° C. for 20 hours under a pressing load of 20 g/cm² and then the adhesive tape was peeled off the laminated paper. The adhesive tape obtained by peeling in this manner was again applied and bonded to the surface of a polished stainless steel plate and then peeled by pulling in the direction making an angle of 180° at a peeling velocity of 300 mm/minute to determine the peeling resistance in g. This value was compared with the value obtained by performing the same peeling test from the stainless steel plate using a fresh adhesive tape and the ratio of them in % is given in Table 3 as the adhesiveness retention.

TABLE 3

| Composition No. | | 13 | | 14 |
|---|---|---|---|---|
| Interval from coating to ultraviolet irradiation, hours | 0 | 3 | 6 | 0 |
| Peeling resistance, g/5 cm | 53 | 55 | 48 | 51 |
| Adhesiveness retention, % | 99 | 100 | 100 | 98 |

EXAMPLE 4

Curable organopolysiloxane compositions No. 15 to No. 17 were prepared each by uniformly blending 200 g of a dimethylpolysiloxane having a viscosity of 1500 centistokes and terminated at both molecular chain ends each with a vinyl dimethyl silyl group, of which the content of the vinyl groups was 0.6% by moles based on the overall amount of the organic groups, 1.0 g of a methylhydrogenpolysiloxane having a viscosity of 40 centistokes and terminated at both molecualr chain ends each with a trimethyl silyl group, the amount corresponding to a molar ratio of the silicon-bonded hydrogen atoms to the silicon-bonded vinyl groups in the dimethylpolysiloxane equal to 1.0, a complex of chloroplatinic acid and a vinylsiloxane containing 5% by weight of platinum in an amount to provide 50 ppm by weight of platinum based on the dimethylpolysiloxane, and 1,3-dichlorobutene-2 in an amount of 0.075 g, 0.75 g or 7.5 g, respectively. For comparison, another composition No. 18 was prepared in the same formulation as above excepting the omission of the 1,3-dichlorobutene-2.

The composition No. 15 had a pot life of 5 hours at 25° C. and the compositions No. 16 and No. 17 each had a pot life of at least 16 hours at the same temperature. Further, each of these compositions was applied to a polyethylene-laminated paper in a coating amount of 0.8 g/m² and heated for 15 seconds in a hot-air circulation oven at 120° C. to examine the curability of the composition. The results were that each of the compositions No. 15 to No. 17 exhibited good curability while curing of the composition No. 18 was incomplete.

EXAMPLE 5

Curable organopolysiloxane compositions No. 19 to No. 21 were prepared each by uniformly blending 100 parts of a dimethylpolysiloxane having a viscosity of 10,000 centistokes and terminated at both molecular chain ends each with a vinyl dimethyl silyl group, of which the content of the vinyl groups was 0.35% by moles based on the overall amount of the organic groups, 1.6 parts of a methylhydrogenpolysiloxane having a viscosity of 15 centistokes and expressed by the formula

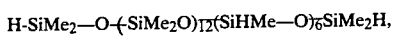

5.0 parts of a finely divided silica flour, 40.0 parts of a quartz powder, 0.11 part of a complex of chloroplatinic acid and a vinylsiloxane containing 2% by weight of platinum, and cis-1,4-dichlorobutene-2 in an amount of 0.018, 0.030 or 0.060 part, respectively. For comparison, another composition No. 22 was prepared in the same formulation as above excepting omission of the cis-1,4-dichlorobutene-2.

The pot life of each of these compositions No.19 to No. 21 was as shown in Table 4 below. The pot life of the composition No. 22 was substantially zero so that this composition could not be used in any practical applications. Table 4 also shows the results of the times for 10% curing and 90% curing of the compositions No. 19 to No. 21 at 150° C. determined from the curability curves illustrated in the figure of the accompanying drawing obtained using a rheometer (manufactured by Toyo Seiki Co.).

A further curable organopolysiloxane composition, which had a viscosity of 500,000 centistokes, was prepared in the same formulation as in the preparation of the composition No. 20 except that the dimethylpolysiloxane had a viscosity of 8,500 centistokes. This composition could be cured by heating at 120° C. for 30 minutes into a rubbery sheet having a hardness, JIS, of 40, tensile strength of 30 kg/cm$^2$ and ultimate elongation of 200%.

TABLE 4

| Composition No. | 19 | 20 | 21 |
| --- | --- | --- | --- |
| cis-1,4-Dichlorobutene-2, parts | 0.018 | 0.030 | 0.060 |
| Pot life, hours | 10 | 20 | 40 |
| Time for 10% curing at 150° C. | 23 | 36 | 51 |
| Time for 90% curing at 150° C. | 46 | 59 | 75 |

What is claimed is:

1. A curable organopolysiloxane composition which comprises:
   (a) 100 parts by weight of an organopolysiloxane having, in a molecule at least two vinyl groups each bonded to a silicon atom different from the other wherein the organo groups are selected from the group consisting of alkyl groups, aryl groups and cycloakyl,
   (b) from 0.1 to 10 parts by weight weight of an organosilicon compounds having, in a molecule, at least two hydrogen atoms each directly bonded to a silicon atom different from the other;
   (c) catalytic amount of a platinum compound; and
   (d) from 0.001 to 5.0 parts by weight of a halogen- or alkoxy-substituted olefinic compound represented by the general formula

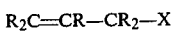

in which each of the groups denoted by R may be same or different and is an atom or group selected from the class consisting of a hydrogen atom, halogen atoms and halogen-substituted or unsubstituted monovalent hydrocarbon groups and X is a halogen atom or an alkoxy group.

2. The curable organopolysiloxane composition as claimed in claim 1 wherein at least 70% by moles of the organic groups in the component (a) other than vinyl groups are methyl groups.

3. The curable organopolysiloxane composition as claimed in claim 1 wherein the organopolysiloxane as the component (a) is a dimethylpolysiloxane having vinyl groups at the molecular chain ends.

4. The curable organopolysiloxane composition as claimed in claim 1 wherein the organopolysiloxane as the component (a) has a viscosity in the range from 10 to 10,000 centistokes at 25° C.

5. The curable organopolysiloxane composition as claimed in claim 1 wherein the organosilicon compound as the component (b) is a methylhydrogenpolysiloxane.

6. The curable organopolysiloxane composition as claimed in claim 1 wherein the amount of the platinum compound as the component (c) is in the range from 0.0001 to 0.1 part by weight as platinum per 100 parts by weight of the component (a).

7. The curable organopolysiloxane composition as claimed in claim 1 wherein the halogen- or alkoxy-substituted olefinic compound as the component (d) is selected from the class consisting of allyl chloride, allyl bromide, allyl iodide, 1,3-dihalogenopropenes, 2,3-dihalogenopropenes, 2-a kyl-3-halogenpropenes, 1,3-dihalogenobutenes-2, 1,4-dihalogenobutenes-2 and alkyl allyl ethers 8. The curable organopolysiloxane composition as claimed in claim 1 wherein the halogen- or alkoxy-substituted olefinic compound as the component (d) is selected from the class consisting of allyl chloride, allyl bromide, allyl iodide, 1,4-dichlorobutene-2, 2,3-dichloropropene, 1,3-dichloropropene, 3-chloro-2-methylpropene, allyl ethyl ether and 1,3-dichlorobutene-2.

* * * * *